(12) United States Patent
Nemoto

(10) Patent No.: US 6,382,339 B1
(45) Date of Patent: May 7, 2002

(54) DRIVING APPARATUS FOR VEHICLES

(75) Inventor: Shusuke Nemoto, Osaka-fu (JP)

(73) Assignee: Kanzaki Kokyukoki Mfg. Co., Ltd., Hyogo-ken (JP)

(*) Notice: Subject to any disclaimer, the term of this patent is extended or adjusted under 35 U.S.C. 154(b) by 0 days.

(21) Appl. No.: 09/439,248

(22) Filed: Nov. 12, 1999

(30) Foreign Application Priority Data

Nov. 11, 1998 (JP) ............................................ 10-320756

(51) Int. Cl.⁷ ............................................ B60K 17/344
(52) U.S. Cl. ........................ 180/248; 180/242; 180/252
(58) Field of Search ............................... 180/252, 253, 180/256, 257, 242, 243, 248, 263

(56) References Cited

U.S. PATENT DOCUMENTS

| | | | | |
|---|---|---|---|---|
| 3,978,937 A | * | 9/1976 | Chichester et al. | 180/242 |
| 4,399,886 A | * | 8/1983 | Pollman | 180/197 |
| 4,528,871 A | * | 7/1985 | Membach | 74/733 |
| 4,669,559 A | | 6/1987 | Fukui | 180/6.24 |
| 4,886,142 A | * | 12/1989 | Yamaoka et al. | 180/242 |
| 4,887,686 A | | 12/1989 | Takei et al. | 180/211 |
| 5,207,060 A | * | 5/1993 | Sheets | 60/483 |
| 5,335,746 A | * | 8/1994 | Betz | 180/248 |
| 5,560,447 A | * | 10/1996 | Ishii et al. | 180/242 |
| 5,564,518 A | * | 10/1996 | Ishii et al. | 180/242 |
| 5,823,284 A | * | 10/1998 | Hoar et al. | 180/240 |

FOREIGN PATENT DOCUMENTS

| | | |
|---|---|---|
| EP | 0 864 482 A2 | 9/1998 |
| GB | 2216 473 A | 10/1989 |
| GB | 2 274 320 | 7/1994 |

* cited by examiner

Primary Examiner—J. J. Swann
Assistant Examiner—L. Lum
(74) Attorney, Agent, or Firm—Knobbe, Martens, Olson & Bear, LLP

(57) ABSTRACT

A driving apparatus is used in a vehicle wherein both the front and rear wheels are driven. The apparatus prevents the steerable wheels from skidding while transmitting power to the steerable wheels when turning the vehicle. The apparatus includes a transmission unit 13 for receiving a rotational output from a main HST 50, a steerable wheel drive shaft 6 and a nonsteerable wheel drive shaft 5 for receiving the rotational output from the transmission unit and delivering the output respectively to an axle for driving the steerable wheels and an axle for driving the nonsteerable wheels, and a differential unit for rotating the drive shaft 6 at an increased speed and the drive shaft 5 at a decreased speed.

7 Claims, 12 Drawing Sheets

DRIVING APPARATUS FOR VEHICLES

DETAILED DESCRIPTION OF THE INVENTION

1. Technical Field of the Invention

The present invention relates to a driving apparatus for use in four-wheel drive vehicles for transmitting power from a drive source to steerable wheels and nonsteerable wheels via a main HST (hydraustatic transmission).

2. Prior Art

When four-wheel drive vehicles having steerable wheels and nonsteerable wheels respectively at a front position and a rear position of the vehicle are turned, a difference occurs in turning radius between the steerable wheel and the nonsteerable wheel. For example, when the vehicle shown in FIG. 1 and having rear wheels serving for steering is turned, the rear wheel turns along a path of a greater radius than the front wheel. If the front and rear wheels are rotated at the same speed, therefore, the rear wheel skids on the terrain. Such a skid of the rear wheel roughs the terrain or causes wear on the rear wheel. Especially with vehicles adapted to travel on lawns like lawn mowers, roughing the terrain is undesirable.

Already proposed to preclude this drawback are (1) a driving apparatus having a one-way clutch provided in the path of power transmission to the steerable wheels for transmitting a driving power to the steerable wheel and also permitting the steerable wheel to rotate at a higher speed than the nonsteerable wheel when the vehicle is turned, and (2) a driving apparatus wherein the path of power transmission to the steerable wheels is provided with a gear transmission unit for giving an increased speed. The gear transmission unit is brought out of operation when the vehicle is advanced straight, or is operated to rotate the steerable wheel at a higher speed than the nonsteerable wheel when the vehicle is turned.

However, the driving apparatus (1) has the drawback the vehicle fails to fully exhibit the performance of four-wheel drive since the nonsteerable wheels only are driven as in a two-wheel drive vehicle when the vehicle is turned. This entails another drawback that the vehicle is impaired in running performance when turning with a small radius since the nonsteerable wheels only are driven for turning.

Further with the driving apparatus (2), the steerable wheel is rotatable only at two speeds, i.e., a high speed and the same speed as the nonsteerable wheel. On the other hand, the difference between the steerable wheel and the nonsteerable wheel in turning radius is proportional to the steering angle of the steering wheel to be handled by a driver. Thus, in order to effectively prevent the steerable wheels from skidding during turning of the vehicle, there is a need to vary the rotational speed difference between the steerable wheel and the nonsteerable wheel. Accordingly the driving apparatus (2) which affords only two different rotational speeds to the steerable wheels fails to fully preclude the steerable wheels from skidding. Further although the driving apparatus is capable of providing two different speeds, i.e., a high speed and the same speed, for the steerable wheel, it is impossible to increase the rotational speed difference between the steerable wheel and the nonsteerable wheel because the rotational speed of the nonsteerable wheel is constant. If the vehicle is turned with a small radius, i.e., if the difference between the steerable wheel and the non and the nonsteerable wheel in turning radius is great, it is difficult to obtain such a speed difference as to offset the radius difference.

Also known is a driving apparatus similar to the apparatus 1 and having a transmission unit for giving an increased speed which unit comprises a pair of pulleys and a belt reeved around the pulleys, the pulleys being variable in effective diameter according to the rotation angle of the steering wheel at the driver's seat. However, although adapted to vary the rotational speed of the steerable wheel, the apparatus also encounters difficulty in increasing the rotational speed difference between the steerable wheel and the nonsteerable wheel since the rotational speed of the nonsteerable wheel is constant.

Further, in a vehicle with a four-wheels steering system, the resembling problem occurs. That is, the turning radius of front ground wheel and rear ground wheel is usually different to each other. Therefore, the adjustment between the rotational speed of the front wheels and the rear wheels is necessary.

SUMMARY OF THE INVENTION

An object of the present invention, which has been accomplished to overcome the foregoing problems, is to provide a driving apparatus for use in four-wheel drive vehicles, the apparatus being adapted to effectively prevent the steerable wheels from skidding while transmitting power to the steerable wheels when turning the vehicle.

To fulfill the foregoing object, the present invention provides a driving apparatus for a vehicle for transmitting power from a drive source installed in a body of the vehicle to steerable wheels and nonsteerable wheels via a main HST, the driving apparatus comprises: a transmission unit for receiving a rotational output from the main HST, a steerable wheel drive shaft and a nonsteerable wheel drive shaft for receiving a rotational output from the transmission unit and transmitting the rotational output respectively to an axle for driving the steerable wheels and an axle for driving the nonsteerable wheels, and a differential unit for rotating the steerable wheel drive shaft at an increased speed and rotating the nonsteerable wheel drive shaft at a decreased speed according to the steering angle of the steering wheel.

Preferably, the driving apparatus can be so constructed that the steerable wheel drive shaft and the nonsteerable wheel drive shaft are arranged on approximately the same axis and spaced apart from each other at opposed ends thereof, the transmission unit comprising: a main drive shaft disposed between the opposed ends of the steerable wheel drive shaft and the nonsteerable wheel drive shaft on the same axis as the two shafts, a driving power transmission mechanism for transmitting the rotational output of the main HST to the main drive shaft, and a steerable wheel planetary gear unit and a nonsteerable wheel planetary gear unit for transmitting the rotation of the main drive shaft respectively to the steerable wheel drive shaft and the nonsteerable wheel drive shaft so as to rotate the wheel drive shafts in the same direction, the steerable wheel planetary gear unit having a first sun gear mounted on the main drive shaft, a first outer wheel surrounding the first sun gear, a first inner gear provided on an inner periphery of the first outer wheel, first planetary gears arranged between the first sun gear and the first inner gear, and a first carrier supported on the steerable wheel drive shaft nonrotatably relative thereto and rotatable with the revolution of the planetary gears, the nonsteerable wheel planetary gear unit having a second sun gear mounted on the main drive shaft, a second outer wheel surrounding the second sun gear, a second inner gear provided on an inner periphery of the second outer wheel, second planetary gears arranged between the second sun gear and the second inner gear, and a second carrier supported on the nonsteerable wheel drive shaft nonrotatably relative thereto and rotatable with the revolution of the second planetary gears.

The driving apparatus can be so constructed that the differential unit comprises: a differential HST for receiving the power from the drive source and outputting a differential rotational drive force, and a second differential power transmission mechanism for receiving the rotational output from the differential HST and giving the first outer wheel and the second outer wheel respective additional rotations in opposite directions to each other, the differential HST being adapted not to output the rotational drive force when the vehicle is advanced straight and to output the rotational drive force with a number of revolutions in accordance with the steering angle of the steering wheel when the vehicle is turned, the differential power transmission mechanism being adapted to give the first outer wheel an additional rotation of the same direction as the rotation of the first sun gear rotated by the main HST and to give the second outer wheel an additional rotation opposite in direction to the rotation of the second sun gear rotated by the main HST.

Further the driving apparatus can be so constructed that the differential HST has a hydraulic pump and a hydraulic motor, at least one of the hydraulic pump and the hydraulic motor being of the variable displacement type which is variable in displacement by operating a displacement altering member, the differential unit comprising a link mechanism coupling the steering wheel to the displacement altering member, the link mechanism being adapted to reduce approximately to zero the discharge rate of one of the hydraulic pump and the hydraulic motor which has the displacement altering member when the steering wheel is in a posture to advance the vehicle straight and to increase the discharge rate as the steering angle of the steering wheel increases when the steering wheel is in a posture to turn the vehicle.

Alternatively, the driving apparatus can be so constructed that the steerable wheel drive shaft and the nonsteerable wheel drive shaft are arranged on approximately the same axis and spaced apart from each other at opposed ends thereof, the transmission unit comprising a first differential gear mechanism having a pair of first sun gears fixedly mounted on the steerable wheel drive shaft and the non-steerable wheel drive shaft, respectively, at their opposed ends, the first differential gear mechanism comprising a first casing covering the pair of first sun gears and rotatably supported on the drive shafts, a first ring gear provided externally on the first casing for receiving the rotational output from the main HST, and a plurality of first planetary gears meshing with the pair of first sun gears and rotatably supported by a shaft fixedly provided inside the first casing and extending diametrically of the casing, the differential unit comprising a differential HST for receiving the power from the drive source and outputting a differential rotational drive force, a second differential gear mechanism for receiving the rotational output from the differential HST, and an adjusting transmission mechanism for transmitting an output from the second differential gear mechanism to the steerable wheel drive shaft and the nonsteerable wheel drive shaft, the second differential gear mechanism comprising a pair of rotary shafts supported by a housing of the driving apparatus, arranged on approximately the same axis and spaced apart from each other at opposed ends thereof, a pair of second sun gears fixedly mounted on the respective rotary shafts at their opposed ends, a second casing covering the pair of second sun gears and rotatably supported on the pair of rotary shafts, a second ring gear provided externally on the second casing for receiving the rotational output from the differential HST, and a plurality of second planetary gears meshing with the pair of second sun gears and rotatably supported by a shaft fixedly provided inside the second casing and extending diametrically of the second casing, the adjusting transmission mechanism comprising two gear trains provided for the steerable wheel drive shaft and the nonsteerable wheel drive shaft respectively and each comprising a drive gear fixed to the rotary shaft, and a driven gear fixed to the corresponding drive shaft, at least one of the two gear trains having at least one intermediate gear so as to render the two driven gears rotatable in directions different from each other, the drive gear and the driven gear of each of the gear trains being equal in diameter.

Preferably, each of the driving power transmission mechanism and the differential power transmission mechanism can be a power transmission gear mechanism.

As explained above, the driving apparatus embodying the invention for use in vehicles comprises a transmission unit for receiving a rotational output from a main HST, a steerable wheel drive shaft and a nonsteerable wheel drive shaft for receiving a rotational output from the transmission unit, and a differential unit for rotating the steerable wheel drive shaft at an increased speed and rotating the nonsteerable wheel drive shaft at a decreased speed according to the steering angle of the steering wheel of the vehicle, so that when the vehicle is turned, the steerable wheels can be effectively precluded from skidding with the vehicle propelled by four-wheel drive.

The transmission unit comprises a main drive shaft for receiving the rotational output of the main HST via a driving power transmission mechanism, and a steerable wheel planetary gear unit and a nonsteerable wheel planetary gear unit for transmitting the rotation of the main drive shaft respectively to the steerable wheel drive shaft and the nonsteerable wheel drive shaft; and the differential unit comprises a differential HST for outputting a rotational drive force in accordance with the steering angle of the steering wheel, and a driving power transmission mechanism for receiving the rotational output of the differential HST, giving the steerable wheel drive shaft an additional rotation for a speed increase and giving the nonsteerable wheel drive shaft an additional rotation for a speed reduction. When the driving apparatus is thus constructed, the rotational speed of the steerable wheels and the nonsteerable wheels can be controlled with good stability for turning the vehicle.

Further when the differential HST is of the variable displacement type having a movable swash plate or like displacement altering member, and the steering wheel is operatively connected to the displacement altering member by a link mechanism, the steering angle of the steering wheel can be operatively related to the rotational output of the differential HST with good stability.

When the driving power transmission mechanism and the differential power transmission mechanism are each a power transmission gear mechanism, an improved transmission efficiency can be achieved.

Another aspect of the present invention provides a driving apparatus for a vehicle for transmitting power via a main HST from a drive source installed in a body of the vehicle to a first pair of driving wheels and a second pair of driving wheels, the pairs of wheels being positioned at the front and rear of the vehicle body and at least one pair of the pairs of driving wheels being steerable, the driving apparatus being characterized in that the driving apparatus comprises: a transmission unit for receiving a rotational output from the main HST, a first drive shaft and a second drive shaft for receiving a rotational output from the transmission unit and transmitting the rotational output respectively to an axle for driving the first pair of wheels and an axle for driving the second pair of wheels, and a differential unit for rotating the first drive shaft and the second drive shaft at a speed adjusted according to the steering angle of a steering wheel to be handled by a driver.

Therefore, for a vehicle with a four-wheels steering system, i.e. for a vehicle with a first pair of driving steerable wheels and a second pair of driving steerable wheels positioned at the front and rear of the vehicle body, the differential unit can be so structured that the differential unit rotates the first drive shaft and the second drive shaft at a speed adjusted according to the steering angle of a steering wheel to be handled by a driver. According to so structured driving apparatus, the pair of the front wheels and the pair of the rear wheels are driven by the first and second drive shafts rotating with adjusted speed according to the steering angle of the steering wheel, and thus precluded from skidding even when the difference between the turning radius of front wheel and rear wheel occurs with turning of a vehicle.

The invention will be further clarified by the description of embodiments with reference to the following accompanying drawings. The invention is not limited to these embodiments, but various modifications are possible without deviation from the scope of the claims.

PREFERRED EMBODIMENT OF THE INVENTION

Figure 1:
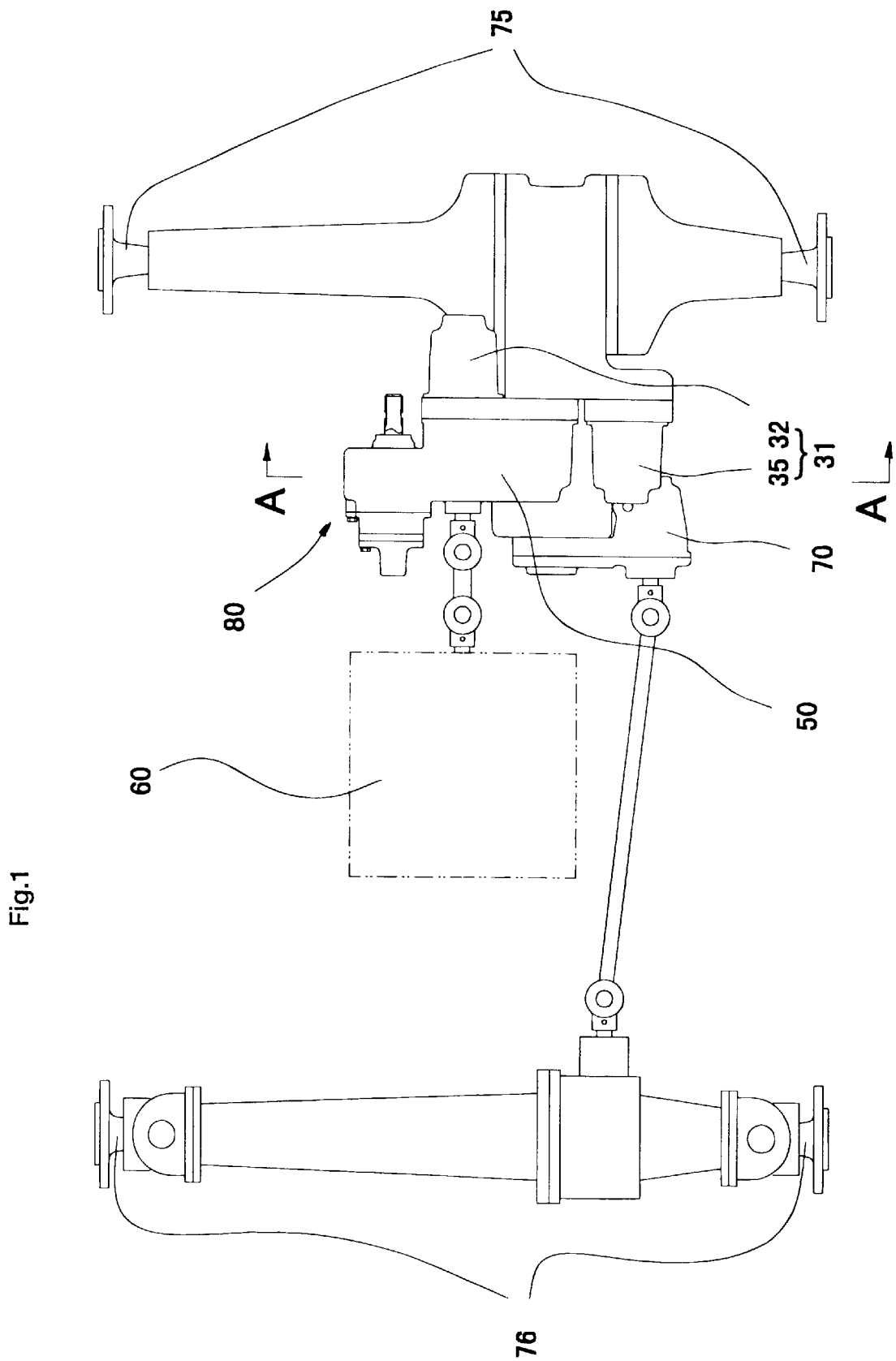
FIG. 1 is a fragmentary plan view of a vehicle comprising a preferred embodiment of driving apparatus of the invention.

A preferred embodiment of driving apparatus of the present invention will be described below with reference to the drawings. FIG. 1 is a fragmentary plan view of a vehicle 100 comprising a driving apparatus 1 embodying the invention. The driving apparatus of the embodiment is adapted for use in four-wheel drive vehicles wherein power is delivered from a drive source 60 installed in the body of the vehicle to a main HST 50, the output of which is transmitted to rear wheels serving as steeling wheels and to the non-steerable wheels, i.e. front wheels as shown in FIG. 1. The apparatus comprises a front wheel drive shaft and a rear wheel drive shaft for outputting a front wheel drive force and rear wheel drive force respectively, a transmission unit for transmitting the output of the main HST to the front wheel drive axle and the rear wheel drive axle, and a differential unit for reducing the rotational speed of the front wheel drive axle and increasing the rotational speed of the rear wheel drive axle according to the steeling angle of the rear wheels when the rear wheels are turned. Indicated at 75 and 76 in the drawing are a front axle and a rear axle, respectively. Indicated at 70 is a rear wheel drive unit connected to the rear axle 76 by an axle coupling for outputting a rear axle drive force. Further indicated at 80 is a PTO unit for delivering a drive force to a mower or the like. Indicated at 31 is a differential HST, and at 32 and 35 are a hydraulic pump and hydraulic motor, respectively, of the differential HST.

Figure 2:
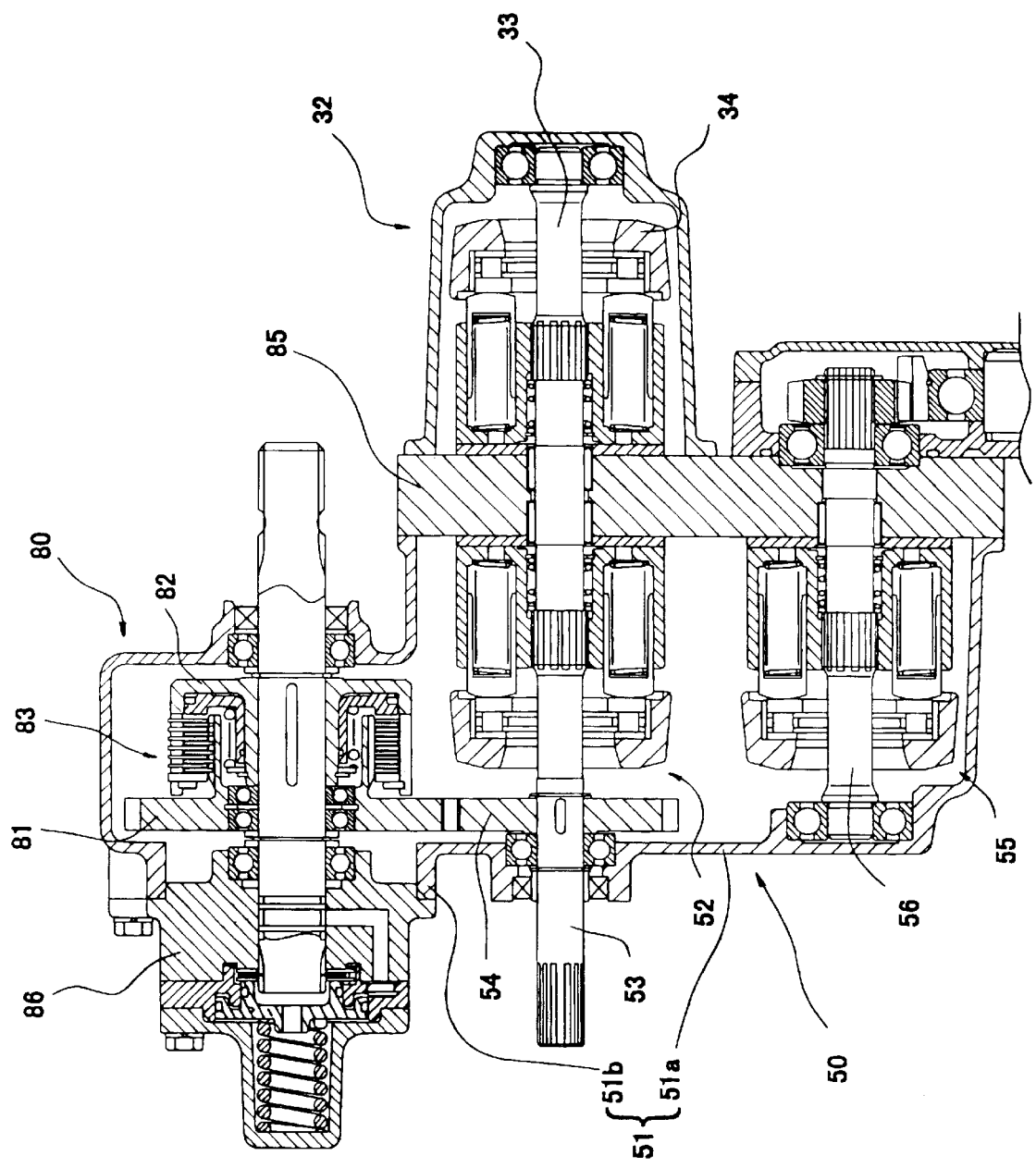
FIG. 2 is a plan view in section of a main HST included in the vehicle of FIG. 1 and the vicinity thereof.

First, the main HST 50 will be described. FIG. 2 is a plan view in section of the main HST and the surroundings thereof. The main HST 50 has a hydraulic pump 52 and a hydraulic motor 55 at least one of which is of the variable displacement type, and a housing 51 for enclosing the pump and the motor. According to the present embodiment, the hydraulic pump 52 is of the variable displacement type, and the hydraulic motor 55 is a fixed displacement motor. The housing 51 has a body 51a and an extension 51b extending outward from the body 51a widthwise of the vehicle. The pump 52 and the motor 55 are accommodated in the housing body 51a, while the PTO unit 80 is enclosed in the housing extension 51b.

The housing body 51a is open at its front side and closed with a rear wall at its rear side, while the extension 51b is closed with a front wall at its front side and open at its rear side. The front opening of the body 51a is closed with a hydraulic block 85, and the rear opening of the extension 51b is closed with a closure member 86. This results in the following advantage. If the body 51a and the extension 51b are both open at the front side in the housing comprising these components 51a, 51b, there arises a need to lengthen the block 85 widthwise of the vehicle body for closing the front opening to entail a cost increase owing to an increase in the amount of material. Since the hydraulic block 85 needs to have a considerable thickness to ensure a quantity of oil, the increase in the length of the block 85 widthwise of the vehicle requires an increased amount of material. When the housing 51 has the construction described, the mold for the body 51a having the front opening can be removed toward the front, and the mold for the extension 51b having the rear opening is removable rearward, with the result that the housing can be cast easily.

The hydraulic pump 52 has a pump shaft 53 extending longitudinally of the vehicle body. The pump shaft 53 has a rear end projecting rearward from the housing 51 and connected to the output shaft of the drive source 60 (see FIG. 1). The pump shaft 53 has a front end extending forward from the housing 51 and projecting forward through the block 85. A gear 54 is supported on the pump shaft 53 at the portion thereof to the rear of the body of the hydraulic pump nonrotatably relative to the shaft. The gear 54 is coupled to a drive member 81 of the PTO unit 80. The PTO unit 80 is on/off-controlled by a hydraulic clutch 83 comprising the drive member 81 and a driven member 82.

On the other hand, the hydraulic motor 55 has a motor shaft 56 provided approximately in parallel to the pump shaft 53. The motor shaft 56 has a front end extending forward from the housing 51 and projecting forward through the hydraulic block 85.

Figure 3:
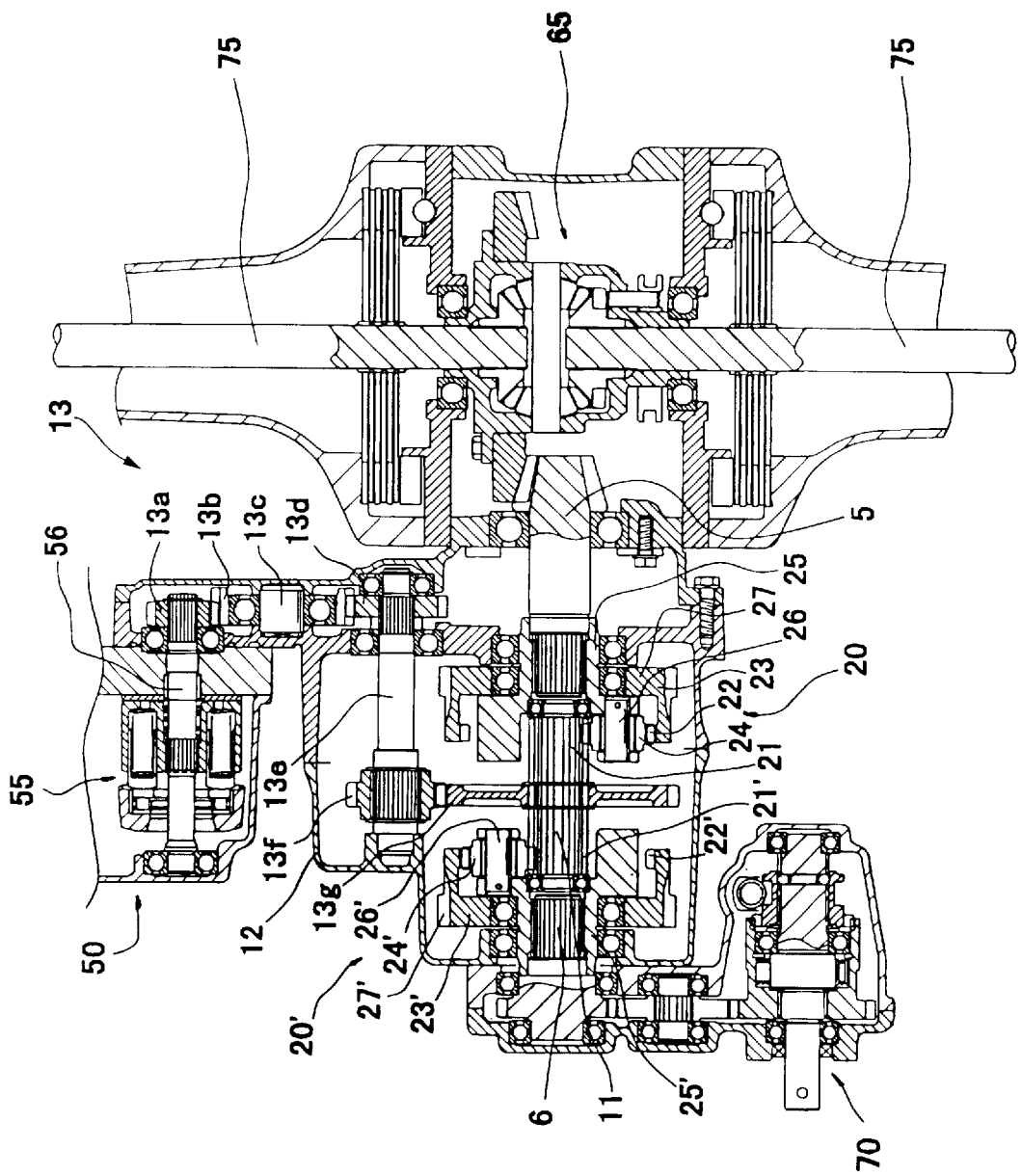
FIG. 3 is a cross sectional view in development showing a front drive shaft, rear drive shaft and transmission unit included in the vehicle of FIG. 1 and the vicinity of these components.

Next, a description will be given of the front wheel drive shaft 5, rear wheel drive shaft 6 and transmission unit 10 of the driving apparatus 1 according to the present invention. FIG. 3 is a cross sectional view in development of the front wheel drive shaft 5, rear wheel drive shaft 6, transmission unit 10, and the surroundings of these components, and FIG. 4 is a view in section taken along the line A—A in FIG. 1.

With reference to FIG. 3, the front wheel drive shaft 5 and the rear wheel drive shaft 6 are arranged on approximately the same axis longitudinally of the vehicle and spaced apart from each other at their opposed ends. More specifically, a predetermined space is provided between the rear end face of the shaft 5 and the front end face of the shaft 6. A differential gear unit 65 for driving the front axle 75 is connected to the front end of the front wheel drive shaft 5, while the aforementioned rear wheel drive unit 70 is connected to the rear end of the rear wheel drive shaft 6.

The transmission unit 10 comprises a main drive shaft 11 disposed in the space between the front wheel drive shaft 5 and the rear wheel drive shaft 6 on the same axis as these shafts, a front wheel planetary gear unit 20 interconnecting the main drive shaft 11 and the front wheel drive shaft 5, a rear wheel planetary gear unit 20' interconnecting the main drive shaft 11 and the rear wheel drive shaft 6, a driving power transmission mechanism 13 interconnecting the hydraulic motor shaft 56 of the main HST and the main drive shaft 11, and a casing 12 housing these components.

Figure 4:
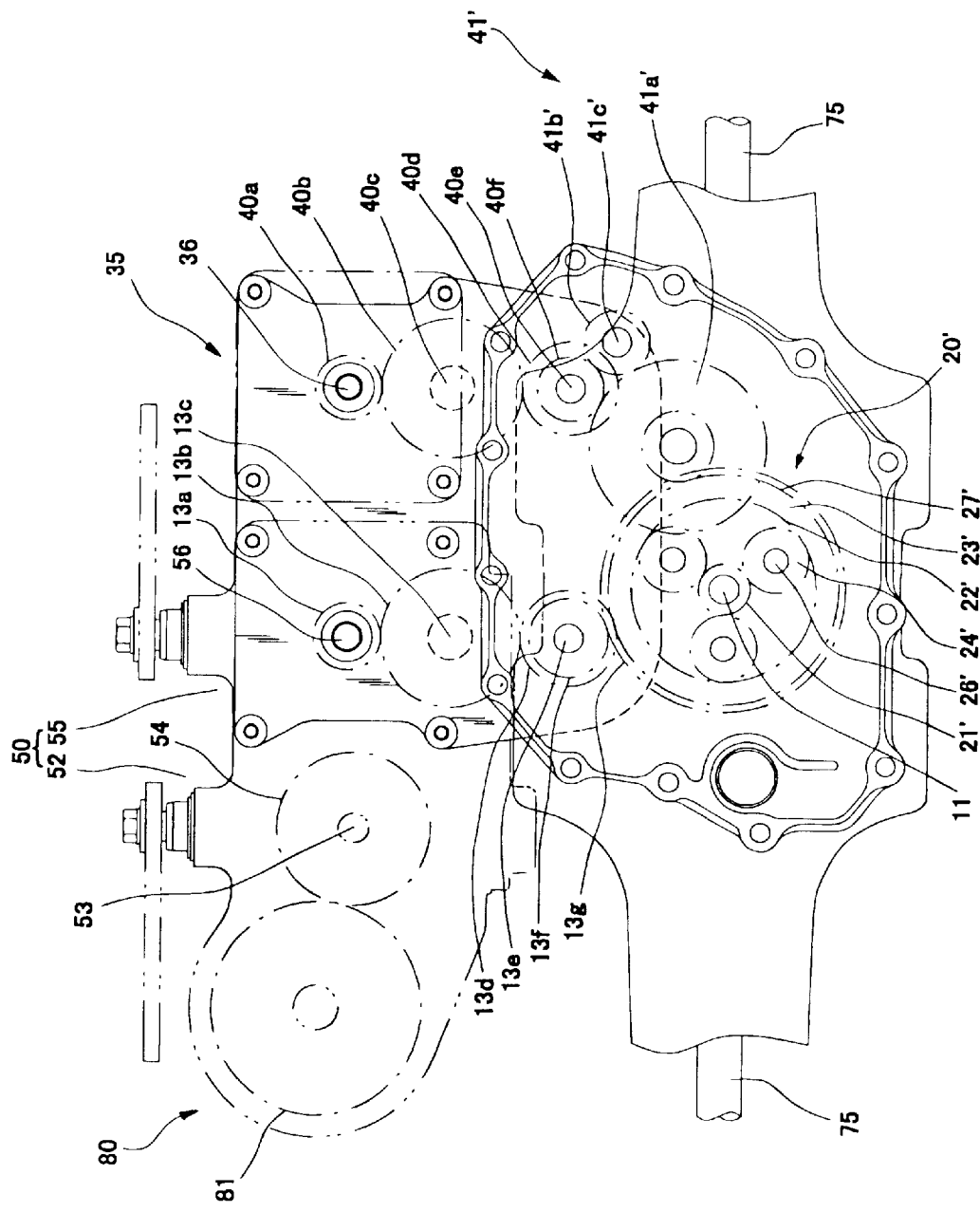
FIG. 4 is a view in section taken along the line A—A in FIG. 1.

With reference to FIGS. 3 and 4, the front wheel planetary gear unit 20 comprises a sun gear 21 mounted on the main drive shaft 11, an outer wheel 23 having an inner gear 22 surrounding the sun gear 21, a plurality of planetary gears 24 meshing with both the sun gear 21 and the inner gear 22, and a carrier 25 supported by the front wheel drive shaft 5 nonrotatably relative thereto. By a pin 26, the carrier 25 is made to rotate with the revolution of the planetary gears 24 around the sun gear 21. Further a gear 27 is provided on the outer periphery of the outer wheel 23. On the other hand, the rear wheel planetary gear unit 20' also comprises the same components as the unit 20, i.e., a sun gear 21', an outer wheel 23', planetary gears 24', a carrier 25' and a gear 27'.

According to the present embodiment, the driving power transmission mechanism 13 is a power transmission gear mechanism which comprises a gear 13a mounted on the motor shaft 56 of the main HST 50 nonrotatably relative thereto, an intermediate gear 13b meshing with the gear 13a, an idle shaft 13c supporting the intermediate gear 13b thereon rotatably relative thereto, a gear 13d meshing with the intermediate gear 13b, a support shaft 13e supporting the gear 13d thereon nonrotatably relative thereto, a gear 13f mounted on the support shaft 13e nonrotatably relative thereto, and a gear 13g meshing with the gear 13f and supported on the main drive shaft 11 nonrotatably relative thereto, whereby an improved transmission efficiency is achieved. Although the transmission mechanism 13 can be of the belt type, it is then likely that the mechanism will be impaired in transmission efficiency, for example, owing to slippage of the belt, whereas such a drawback can be effectively precluded with the mechanism of the present embodiment.

Figure 5:
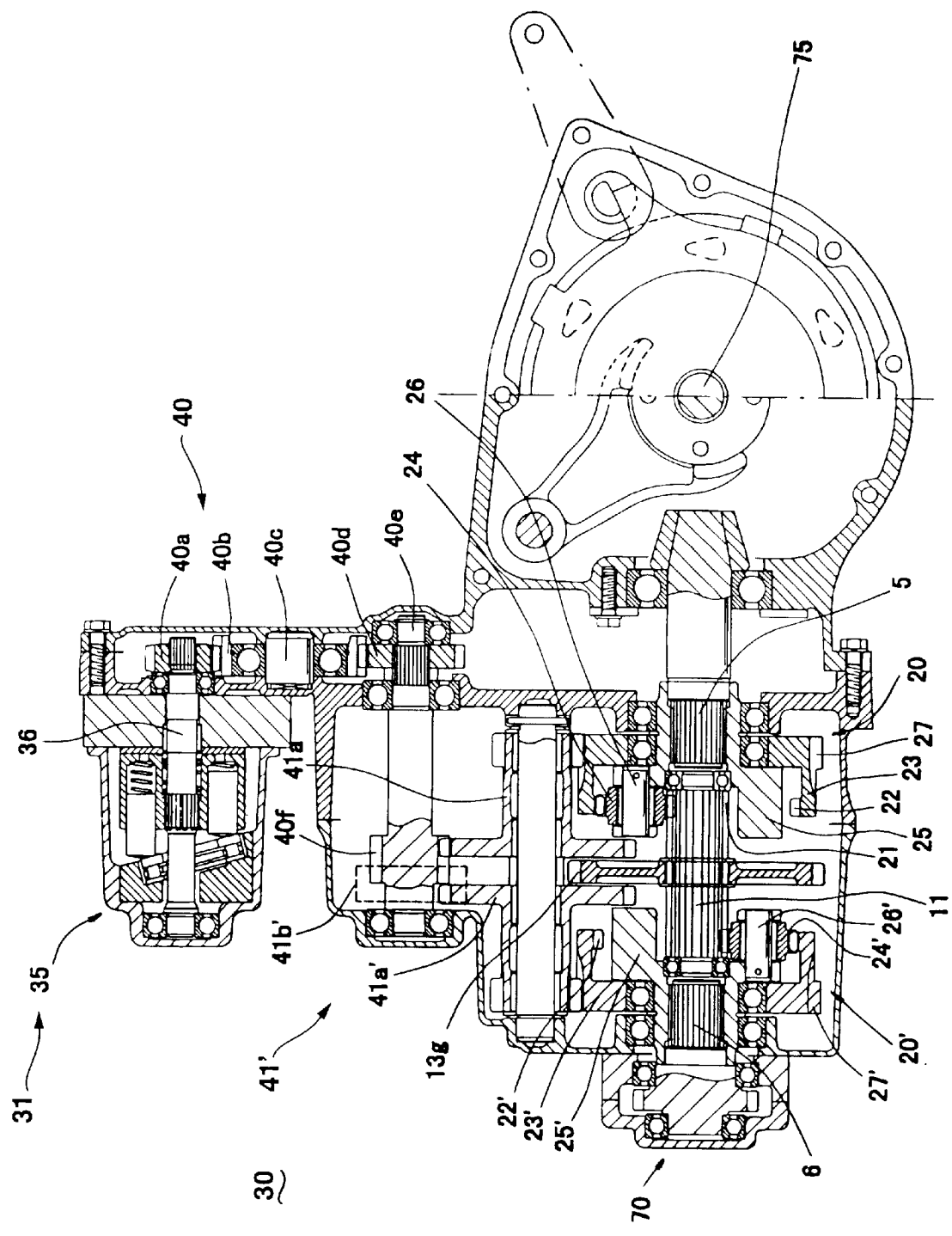
FIG. 5 is a development in vertical section of a differential unit included in the vehicle of FIG. 1 and the vicinity thereof.

The differential unit 30 will be described next which is included in the driving apparatus of the invention. FIG. 5 is a development in vertical section of the differential unit 30 and the vicinity thereof. The differential unit 30 comprises a differential HST 31 having a hydraulic pump 32 and a hydraulic motor 35 at least one of which is of the variable displacement type. According to the present embodiment, the hydraulic pump 32 is of the variable displacement type, and the hydraulic motor 35 is a fixed displacement motor. As shown in FIGS. 1 and 2, the hydraulic pump 32 is disposed in front of the hydraulic block 85 and has a pump shaft provided by a forwardly projecting portion of the pump shaft 53 of the main HST 50. Indicated at 34 in FIG. 2 is a movable swash plate for controlling the output of the hydraulic motor 35 by varying the discharge rate of the hydraulic pump 32. On the other hand, the hydraulic motor 35 is disposed in parallel to the main HST 50, in the rear of the casing of the differential gear unit 65 as seen in FIGS. 1, 4 and 5.

The differential unit 30 further comprises a differential power transmission mechanism 40 for delivering the rotational output of the hydraulic motor 35 of the differential HST 31 to the front wheel planetary gear unit 20 and the rear wheel planetary gear unit 20' therethrough. The power transmission mechanism 40 is adapted to give the outer wheel 23' of the rear wheel planetary gear unit 20' and the outer wheel 23 of the front wheel planetary gear unit 20 additional rotations in opposite directions to each other. According to the present embodiment, the mechanism 40 comprises, as shown in FIGS. 4 and 5, a gear 40a mounted on the motor shaft 36 of the differential HST 31 nonrotatably relative thereto, an intermediate gear 40b meshing with the gear 40a, an idle shaft 40c supporting the intermediate gear 40b thereon rotatably relative thereto, a gear 40d meshing with the intermediate gear 40b, a support shaft 40e supporting the gear 40d thereon nonrotatably relative thereto, and a gear 40f mounted on the support shaft 40e nonrotatably relative thereto. The mechanism 40 further comprises a front wheel transmission member 41 for delivering a rotation of the same direction as the rotation of the gear 40f to the outer wheel 23 of the front wheel planetary gear unit 20, and a rear wheel transmission member 41' for delivering a rotation opposite in direction to the rotation of the gear 40f to the outer wheel 23' of the rear wheel planetary gear unit 20'. The front wheel transmission member 41 comprises a gear member 41a meshing with both the gear 40f and the outer wheel 23 of the front wheel planetary gear unit 20. On the other hand, the rear wheel transmission member 41' comprises an idle gear 41b', an idle shaft 41c' supporting the idle gear 41b' thereon rotatably relative thereto, and a gear member 41a' meshing with both the idle gear 41b' and the outer wheel 23' of the rear wheel planetary gear unit 20'.

Figure 6:
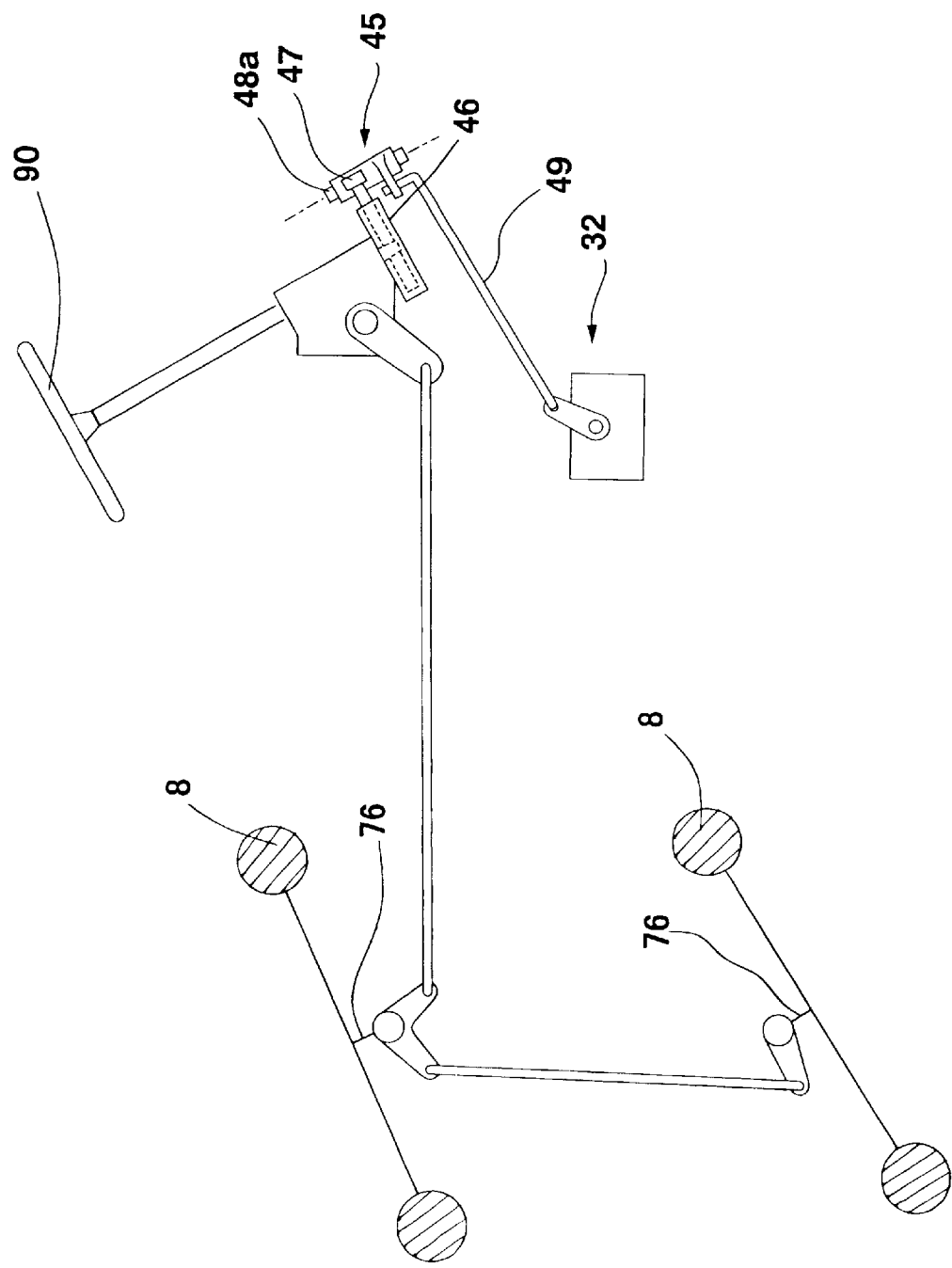
FIG. 6 is a diagram showing the steering wheel of the vehicle of FIG. 1 and the rear wheels thereof as coupled thereto.
Figure 7:
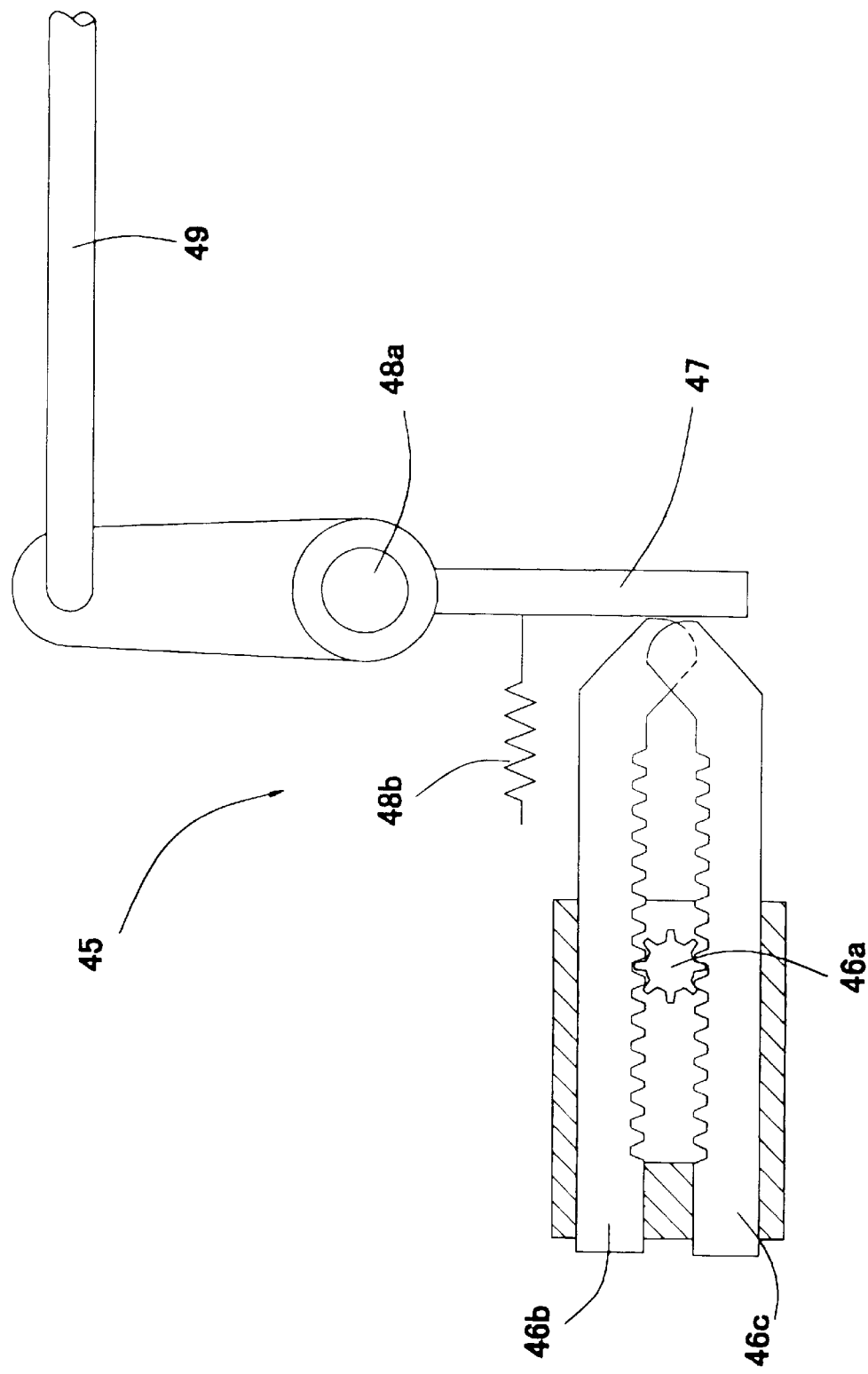
FIG. 7 is a diagram showing a link mechanism of the driving apparatus according to the embodiment when the vehicle is advanced straight.
Figure 8:
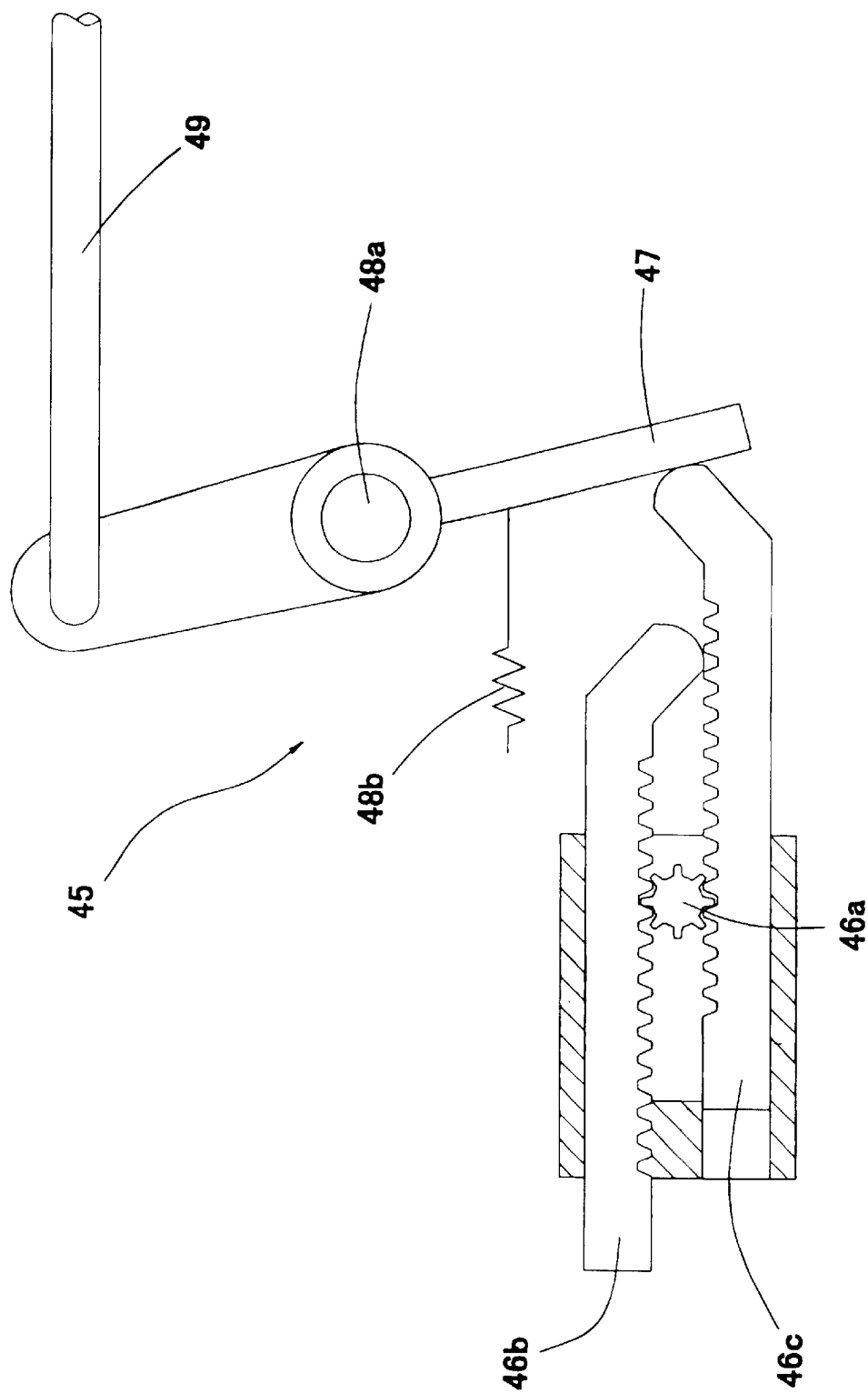
FIG. 8 is a diagram showing the link mechanism of FIG. 7 when the vehicle is turned counterclockwise.
Figure 9:
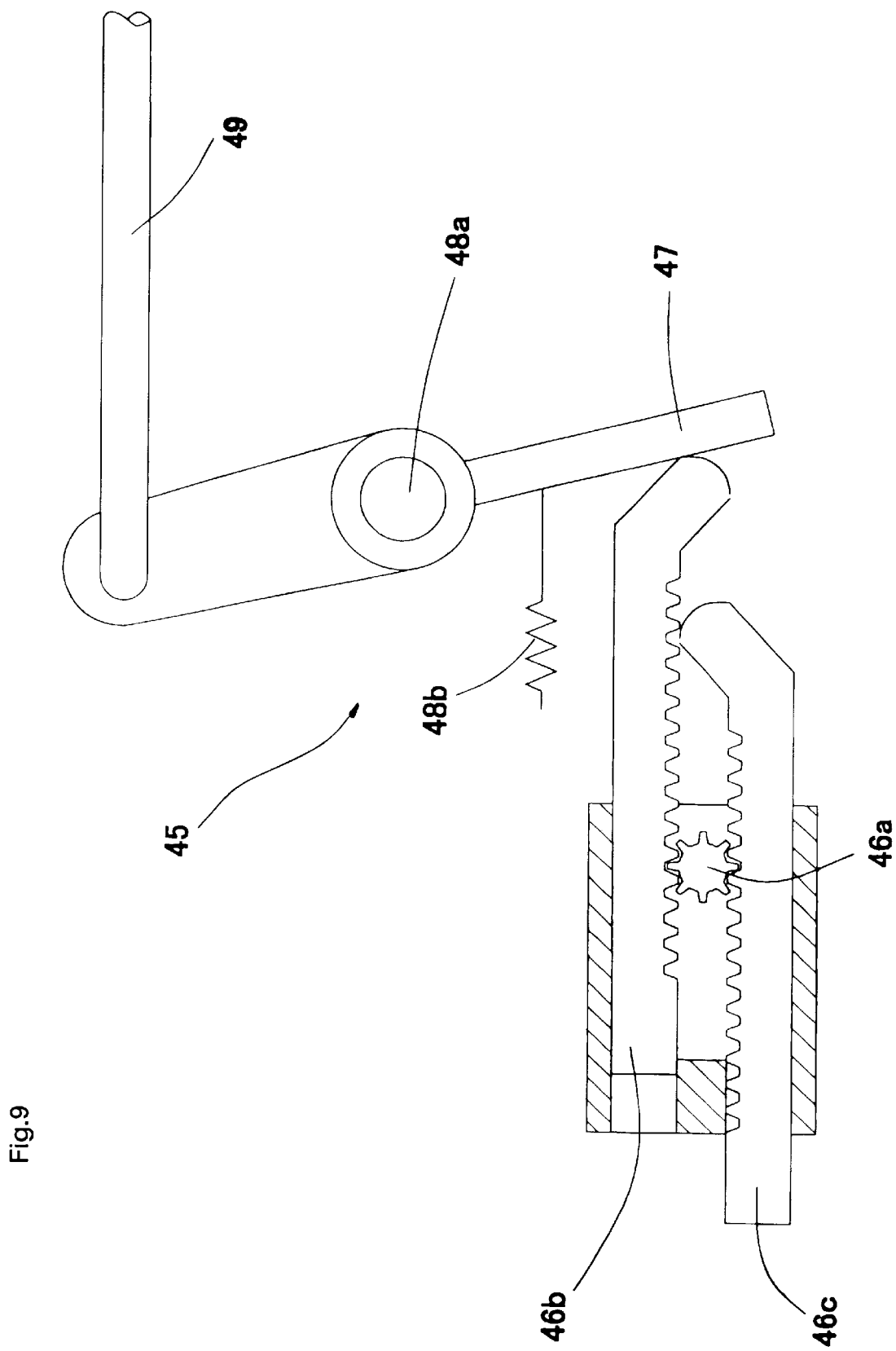
FIG. 9 is a diagram showing the link mechanism of FIG. 7 when the vehicle is turned clockwise.

The differential unit 30 is further provided with a link mechanism 45 for operatively connecting the movable swash plate 34 of the hydraulic pump 32 of the differential HST 31 to a steering wheel 90 at the driver's seat. FIG. 6 shows the steering wheel 90 and the rear wheels 8 as coupled thereto. Indicated at 46 in the drawing is a rack-and-pinion assembly. FIGS. 7 to 9 schematically show the link mechanism 45. FIG. 7 shows the state of the link mechanism 45 when the vehicle is advanced straight. FIGS. 8 and 9 show the states of the link mechanism 45 when the vehicle is turned to the left and when the vehicle is turned to the right, respectively.

With reference to FIGS. 7 to 9, the link mechanism 45 comprises the rack-and-pinion assembly 46, a pivotal plate 47 movable about a pivot 48a in operative relation with the assembly 46, and a connector 49 for connecting the pivotal plate 47 to the movable swash plate 34.

The rack-and-pinion assembly 45 comprises a pinion 46a fixed to the rotary shaft of the steering wheel 90, and a pair of racks 46b, 46c arranged at opposite sides of the pinion 46a. In operative relation with the rotation of the steering wheel, one of the racks is slidable toward the pivotal plate, and the other rack is slidable in the opposite direction. As shown in FIG. 7, the pair of racks 46b, 46c are so adapted that the corresponding rack ends are in the same position when the vehicle is advanced straight, that is, when the steering wheel 90 is not rotated. The pair of racks 46b, 46c are arranged at different positions with respect to the direction of rotary shaft of the pinion 46a and are therefore unlikely to come into contact with each other. The pivotal plate 47 is biased toward the pair of racks 46b, 46c by a biasing member 48b at all times. The connector 49 is so connected to the swash plate 34 as not to incline the swash plate 34 when the vehicle is advanced straight, namely, when the pivotal plate 47 is in the position shown in FIG. 7 and as to incline the swash plate 34 when the vehicle is turned, namely when the pivotal plate is in the position shown in FIG. 8 or 9.

The link mechanism 45 operates in the following manner. When the vehicle is being advanced straight without rotating the steering wheel 90, the pair of racks 46b, 46c do not push the pivotal plate 47. The pivotal plate 47 in this state does not incline the movable swash plate 34 as stated above. Accordingly, the motor shaft 36 of the differential HST 31 is held out of rotation during the straight advance of the vehicle. If the vehicle is turned leftward or rightward, i.e., when the steering wheel 90 is rotated counterclockwise or clockwise, one of the racks 46b, 46c pushes the pivotal plate 47 as shown in FIG. 8 or 9, whereby the pivotal plate 47 is moved about the pivot 48a to incline the swash plate 34. Accordingly, the motor shaft 36 of the differential HST 31 rotates when the vehicle is turned. Moreover, the inclination of the swash plate 34 is in proportion to the angle through which the pivotal plate 47 is pivotally moved, and the angle of pivotal movement of the pivotal plate 47 is proportional to the rotation angle of the steering wheel 90, so that the rotational speed of the motor shaft 36 of the differential HST 31 varies in proportion to the rotation angle of the steering wheel 90, i.e., to the steering angle of the rear wheels 8. It is desired to incline the end portions of the racks 46b, 46c to be brought into contact with the pivotal plate 47 as shown in FIGS. 7 to 9 so that the position of contact of the rack 46b with the plate 47 and the position of contact of the other rack 46c with the plate 47 will be at equal distances from the axis of the pivot 48a. The angle of pivotal movement of the pivotal plate 47 by the sliding movement of the rack 46b can then be made equal to the angle of pivotal movement of the plate 47 by the movement of the other rack 46c.

Figure 10:
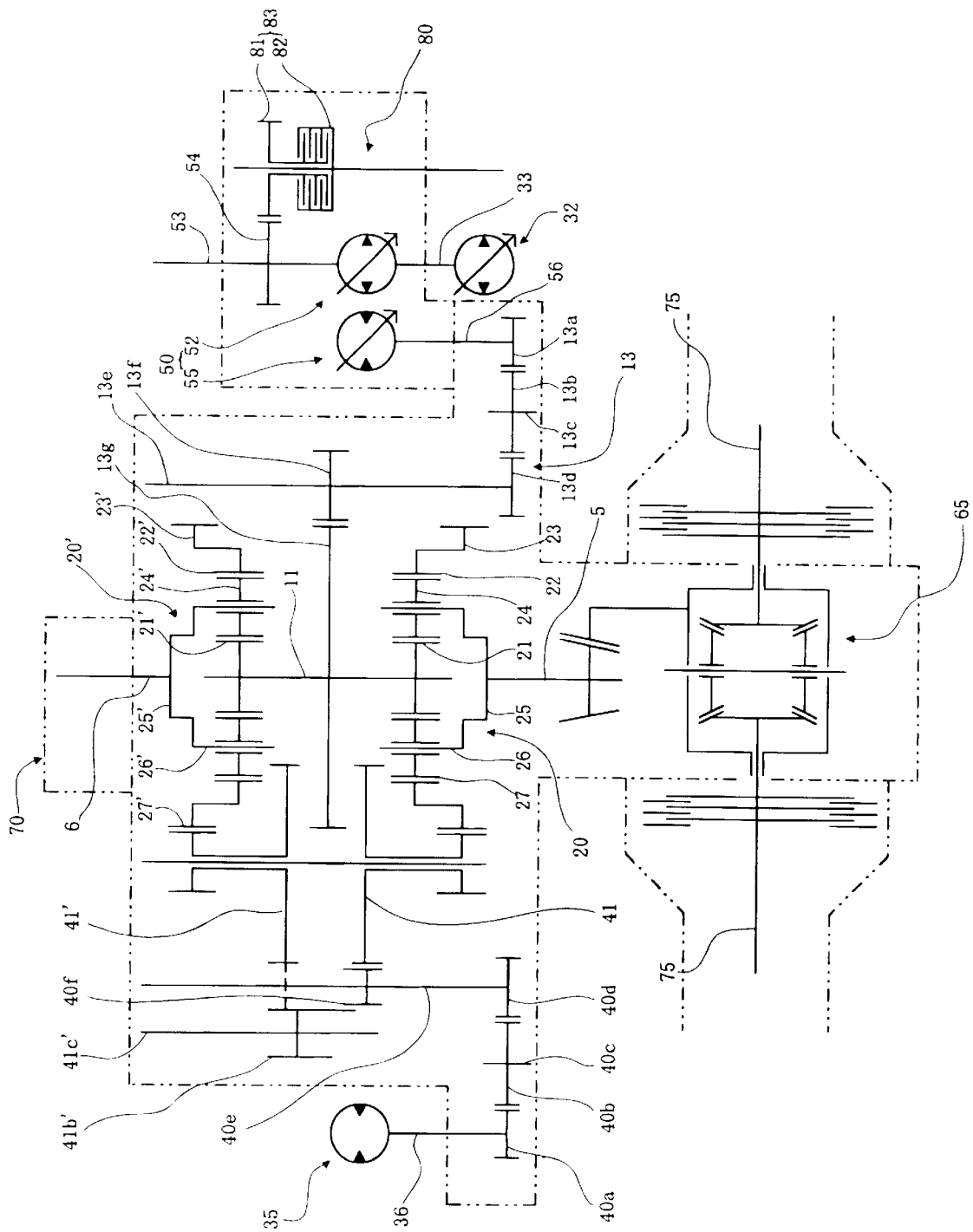
FIG. 10 is a diagram showing the power transmission system of the vehicle of FIG. 1.
Figure 11:
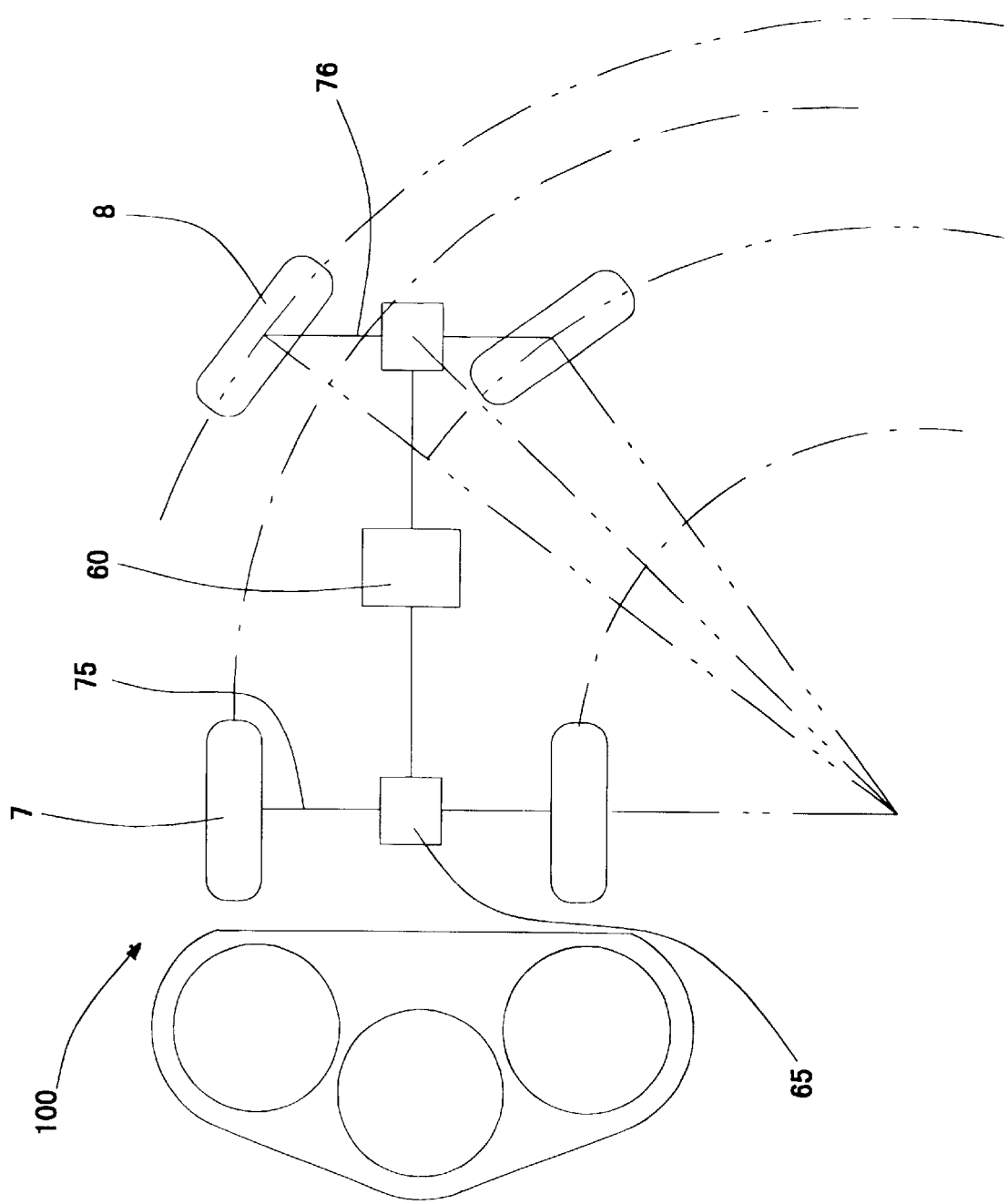
FIG. 11 is a diagram showing differences in turning radius between the steerable wheels and nonsteerable wheels of the vehicle of FIG. 1.

The operation of the driving apparatus 1 thus constructed will be described below. FIG. 10 is a diagram of the power transmission system of the vehicle 100 comprising the driving apparatus 1.

The transmission unit 10 for transmitting the rotational output of the main HST 50 will be described first. The rotational output of the motor shaft 56 of the main HST 50 is transmitted by the driving power transmission mechanism 13 to the main drive shaft 11, which has fitted therearound the sun gear 21 of the front wheel planetary gear unit 20 and the sun gear 21' of the rear wheel planetary gear unit 20'. Accordingly, the sun gears 21, 21' are rotated at the same speed in the same direction.

The differential unit 30 will be described next. When the vehicle is advanced straight, that is, when the steering wheel 90 is not rotated, the differential unit 30 operates in the following manner. When the vehicle is advanced straight, the motor shaft 36 of the differential HST 31 does not rotate as previously stated. Consequently, the outer wheels 23, 23' coupled to the motor shaft 36 by the differential power transmission mechanism 40 are held out of rotation. Thus, the inner gears 22, 22' of the planetary gear units 20, 20' are held fixed when the vehicle is advanced straight. On the other hand, the sun gears 24, 24' are held in rotation at the same speed in the same direction by the rotational output of the main HST 50 as previously stated. Accordingly, the planetary gears 24, 24' revolve at the same speed in the same direction, causing the pins 26, 26' to rotate the respective carriers 25, 25' at the same speed in the same direction. The front wheel drive shaft 5 and the rear wheel drive shaft 6 are rotated at the same speed in the same direction, rotating the front and rear wheels 7, 8 at the same speed in the same direction.

Now, the gear ratio between the sun gears 21, 21' and the carrier 25, 25' will be considered. Suppose the number of teeth of each of the sun gears 21, 21' is Za, the number of teeth of each of the planetary gears 24, 24' is Zb, and the number of teeth of each of the inner gears 22, 22' is Zc. Assuming that the carriers 25, 25' rotate Nd turns when the sun gears 21, 21' are rotated Na turns, the number of turns Nc of the outer wheels 23, 23' is expressed by Equation (1) in Table 1.

TABLE 1

|  | Sun gear 21, 21' | Planetary gear 24, 24' | Outer wheel 23, 23' | Carrier 25, 25' |
| --- | --- | --- | --- | --- |
| All fixed | Nd | Nd | Nd | Nd |
| Carrier fixed | Na − Nd | −(Na − Nd)*(Za/Zb) | −(Na − Nd)*(Za/Zb)*(Zb/Zc) | 0 |
| Combined speed | Na | Nb = Nd − (Na − Nd)*(Za/Zb) | Nc = Nd − (Na − Nd)*(Za/Zc) Equation(1) | Nd |

Equation (1) can be modified as $$Nd=(Za*Na+Nc)/(Za+Zc) \qquad \text{Equation (2)}$$

When the vehicle is advanced straight, the inner gears 22, 22' are in the fixed state as previously stated, that is, the outer wheels 23, 23' are held fixed, so that Nc=0. The number of revolutions Nd of the carriers is given by $$Nd=(Za*Na)/(Za+Zc) \qquad \text{Equation (3)}$$

Next, a description will be given of the operation of the differential unit 30 when the vehicle is turned, namely, when the steering wheel 90 is rotated counterclockwise or clockwise. When the vehicle is turned, the motor shaft 36 of the differential HST 31 rotates at a speed in accordance with the rotation angle of the steering wheel 90 as already described. The rotational output of the motor shaft 36 of the differential HST 31 is delivered through the differential power transmission mechanism 40 to the outer wheel 23 of the front wheel planetary gear unit 20 and the outer wheel 23' of the rear wheel planetary gear unit 20' as additional rotations in directions opposite to each other.

As will be apparent from Equation (2), therefore, the carrier 25' of the gear unit 20' is rotated at an increased speed while the carrier 25 of the gear unit 20 is rotated at a decreased speed when the differential power transmission mechanism 40 is so designed as to rotate the outer wheel 23' of the gear unit 20' in the same direction as the rotation of the sun gear 21' and to rotate the outer wheel 23 of the gear unit 20 in opposite direction to the rotation of the sun gear 21. Consequently, the rear wheel drive shaft 6 rotates at a higher speed than when advancing the vehicle straight, and the front wheel drive shaft 5 rotates at a lower speed than when advancing the vehicle straight, causing the rear wheels 8 to rotate at an increased speed and the front wheels 7 to rotate at a reduced speed.

Thus, the driving apparatus 1 according to the present embodiment is adapted to rotate the steerable wheels and the nonsteerable wheels at the same speed when advancing the vehicle straight and to rotate the steerable wheels, i.e., the rear wheels 8, at an increased speed and the nonsteerable wheels, i.e., the front wheels 7, at a reduced speed when turning the vehicle. This effectively obviates the skids of the steerable wheel owing to the difference in turning radius between the steerable wheel and the nonsteerable wheel during turning of the vehicle.

Furthermore, the driving apparatus 1 is adapted to drive the steerable wheels at an increased speed and the nonsteerable wheels at a decreased speed and therefore provides a capability of a great rotational speed difference between the steerable wheels and the nonsteerable wheels. Accordingly, even if a great difference occurs in turning radius between the steerable wheel and the nonsteerable wheel by a sharp turn of the vehicle, a speed difference is readily available to offset the great difference in turning radius.

The driving apparatus 1 is so designed as to vary the speed increasing ratio of the steerable wheels and the reduction ratio of the nonsteerable wheels by varying the speed of the motor shaft 36 of the differential HST in proportion to the rotation angle of the steering wheel 90. It is therefore possible to produce a rotational speed difference between the steerable wheel and the nonsteerable wheel in accordance with the turning radius difference therebetween which varies in proportion to the steering angle of the steering wheel.

With the conventional driving apparatus which gives a definite rotational speed to the nonsteerable wheels and gives the steerable wheels only two different rotational speeds, i.e., the same speed as the nonsteerable wheels and a speed higher than this speed, the rotational speed difference between the steerable wheel and the nonsteerable wheel is constant regardless of the steering angle of the steering wheel, whereas the difference in turning radius between the steerable wheel and the nonsteerable wheel varies with the steering angle of the steering wheel. The conventional apparatus is therefore unable to effectively preclude the steerable wheel from skidding.

With the driving apparatus 1 of the present embodiment, on the other hand, the rotational speed difference between the steerable wheel and the nonsteerable wheel is variable with the steering angle of the steering wheel, so that the skid of the steerable wheel can be prevented effectively in accordance with the steering angle of the steering wheel.

Although the present embodiment has been described with reference to a vehicle wherein the rear wheels are steerable wheels and the front wheels are nonsteerable wheels, the invention is not limited to such vehicles but is of course applicable also to vehicles wherein the front wheels serve for steering, and the rear wheels are nonsteerable wheels.

Figure 12:
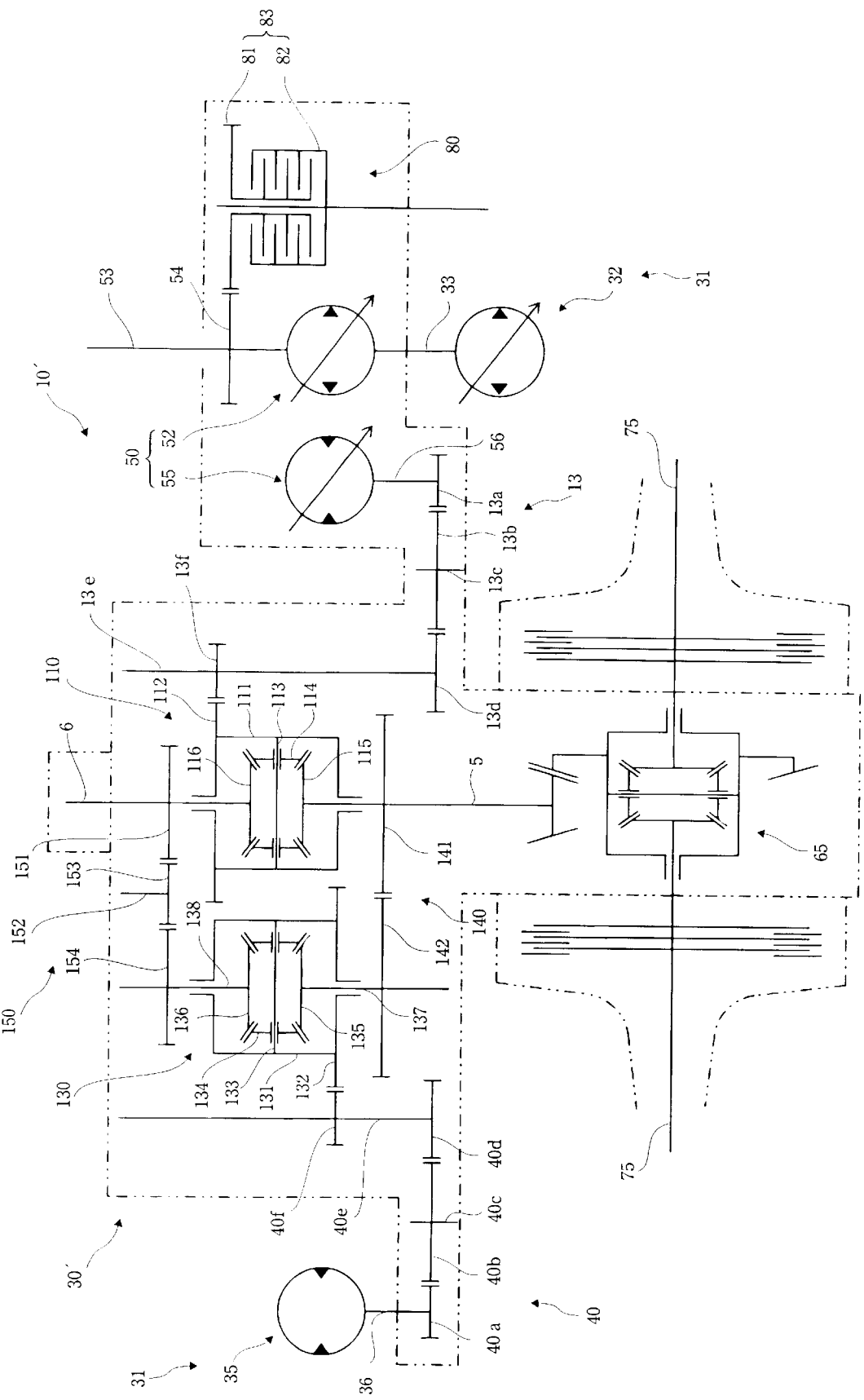
FIG. 12 is a diagram showing a power transmission system of a vehicle modified from the system shown in FIG. 10.

FIG. 12 shows another embodiment of the driving apparatus of the present invention. Throughout the drawings showing the first and second embodiments, like parts are designated by like reference numerals and will not be described in detail repeatedly. The driving apparatus, which has basically the same construction as the foregoing embodiment, comprises a transmission unit 10' for receiving the rotational output of the main HST 50, and a differential unit 30' for adjusting the rotation of the steerable wheel drive shaft 5 and the nonsteerable wheel drive shaft 6 according to the steering angle of the steering wheel. As in the first embodiment, the steerable wheel drive shaft 5 and the nonsteerable wheel drive shaft 6 are arranged on approximately the same axis and spaced apart from each other at opposed ends thereof. The transmission unit 10' comprises a first differential gear mechanism 110 having a pair of first sun bevel gears 115, 116 fixedly mounted on the steerable wheel drive shaft 5 and the nonsteerable wheel drive shaft 6, respectively, at their opposed ends. The first differential gear mechanism 110 comprises a first casing 111 covering the pair of first sun gears 115, 116 and rotatably supported on the drive shafts 5, 6, a first ring gear 112 provided externally on the first casing 111 for receiving the rotational output from the main HST 50, and a plurality of first planetary bevel gears 114 meshing with the pair of first sun gears 115, 116 and rotatably supported by a shaft 113 fixedly provided inside the first casing 111 and extending diametrically of the casing.

The differential unit 30' comprises a differential HST 31 for receiving power from the drive source and outputting a differential rotational drive force, a second differential gear mechanism 130 for receiving the rotational output from the differential HST, and an adjusting transmission mechanism for transmitting an output from the second differential gear mechanism to the steerable wheel drive shaft 5 and the nonsteerable wheel drive shaft 6. The second differential gear mechanism 130 comprises a pair of rotary shafts 137, 138 supported by the housing of the driving apparatus, arranged on approximately the same axis and spaced apart from each other at opposed ends thereof, a pair of second sun bevel gears 135, 136 fixedly mounted on the respective rotary shafts at their opposed ends, a second casing 131 covering the pair of second sun gears and rotatably supported on the pair of rotary shafts, a second ring gear 132 provided externally on the second casing for receiving the rotational output from the differential HST 31, and a plurality of second planetary bevel gears 134 meshing with the pair of second sun gears and rotatably supported by a shaft 133 fixedly provided inside the second casing 131 and extending diametrically of the second casing.

The adjusting transmission mechanism comprises two gear trains 140, 150 each comprising a drive gear 142 (154) fixed to the rotary shafts 137 (138), and a driven gear 141 (151) fixed to the steerable wheel drive shaft 5 (the nonsteerable wheel drive shaft 6). At least one of the two gear trains has at least one intermediate gear so as to render the two driven gears 141, 151 rotatable in directions different from each other. With the present embodiment, the gear train 150 has one intermediate gear 153 mounted on a shaft 152. In the gear trains 140, 150, the gears 141, 142 are equal in diameter, and the gears 151, 154 are equal in diameter.

The driving apparatus shown in FIG. 12 operates in the following manner. The output of motor shaft 56 of the main HST 50 is delivered via the driving power transmission mechanism 13 to the ring gear 112. The rotation of the ring gear 112 is transmitted to the steerable wheel drive shaft 5 and the nonsteerable wheel drive shaft 6 by way of the first casing 111, the planetary gears 113 and the pair of sun gears 115, 116. The shafts 5, 6 have their rotational speed altered by the action of the two gear trains 140, 150 of the adjusting transmission mechanism in the following manner.

When the vehicle is advanced straight, the motor shaft 36 of the differential HST 31 does not rotate as in the first embodiment. Accordingly, the ring gear 132 and the second casing 131 are held out of rotation which are coupled to the motor shaft 36 via the differential power transmission mechanism 40. As a result, the rotary shafts 137, 138 of the second differential gear mechanism 130 are rotated at the same speed by the sun gears 135, 136 and the planetary gears 134. The gears 141 and 151 are therefore rotated also at the same speed. Consequently, the drive shafts 5, 6 connected to the first differential gear mechanism 110 are also rotated at the same speed, thus driving the steerable wheels and the nonsteerable wheels at the same speed.

When the vehicle is turned, on the other hand, the motor shaft 36 of the differential HST 31 rotates at a speed in accordance with the rotation angle of the steering wheel in the driver's seat as described in the first embodiment. The output of the motor shaft 36 rotates the ring gear 132 of the second differential gear mechanism 130 via the differential power transmission mechanism 40. The second casing 131 therefore rotates, consequently increasing or reducing the number of revolutions of the shafts 137, 138 by a quantity equal to the number of revolutions of the second casing.

The increase or reduction in the number of revolutions of the shafts 137, 138 is transmitted in the following manner. The two gear trains 140, 150 are so adapted that the two driven gears 141, 151 rotate in directions different from each other as previously described. In diameter, moreover, the gears 141, 142 are equal, and the gears 151, 154 are equal. Accordingly, when the rotary shafts 137, 138 rotate at a speed increased by the same number of revolutions, one of the gears 141, 151 increases and the other gear reduces in speed by the same number of revolutions.

When the differential power transmission mechanism 40 is so adapted as to give an increased speed to the gear 141 and a reduced speed to the gear 151 by the rotation of the motor shaft 36 of the differential HST 31 when the vehicle is turned, the steerable wheel drive shaft 5 is therefore rotated at an increased speed and the nonsteerable wheel drive shaft 6 at a reduced speed for turning the vehicle. This effectively precludes the skids of the steerable wheels due to the difference in turning radius between the steerable wheel and the nonsteerable wheel during turning of the vehicle in the vehicle driving apparatus shown in FIG. 12 as in the first embodiment. According to the present embodiment, the function described above is available by making the first and second differential gear mechanisms 110, 130 identical in construction and attaching these mechanisms, as oriented in opposite directions, to the housing of the driving apparatus. This permits use of common components for these two mechanisms, consequently leading to a reduction in manufacturing cost.

We claim:

1. A driving apparatus for a vehicle for transmitting power from a drive source installed in a body of the vehicle to steerable wheels and nonsteerable wheels via a main HST, the driving apparatus being characterized in that the driving apparatus comprises:

a transmission unit for receiving a rotational output from the main HST, a steerable wheel drive shaft and a nonsteerable wheel drive shaft for receiving a rotational output from the transmission unit and transmitting the rotational output respectively to an axle for driving the steerable wheels and an axle for driving the nonsteerable wheels, and a differential unit for increasing a rotational speed of the steerable wheel drive shaft and decreasing a rotational speed of the nonsteerable wheel drive shaft proportionally according to a steering angle of a steering wheel to be handled by a driver, the transmission unit comprising a main drive shaft disposed between the steerable wheel drive shaft and the nonsteerable wheel drive shaft, a driving power transmission mechanism for transmitting the rotational output of the main HST to the main drive shaft, and a steerable wheel planetary gear unit and a nonsteerable wheel planetary gear unit for transmitting rotation of the main drive shaft respectively to the steerable wheel drive shaft and the nonsteerable wheel drive shaft so as to rotate the wheel drive shafts in a same direction, and the differential unit comprising a differential HST for receiving the power from the drive source and outputting an adjusted rotational drive force proportionally according to the steering angle of the steering wheel, and a differential power transmission mechanism for receiving the rotational output from the differential HST and giving mutually opposite additional rotations respectively to the steerable wheel planetary gear unit and the nonsteerable wheel planetary gear unit to cause the increased rotational speed of the steerable wheel drive shaft and the decreased rotational speed of the nonsteerable wheel drive shaft.

2. A driving apparatus for a vehicle for transmitting power from a drive source installed in a body of the vehicle to steerable wheels and nonsteerable wheels via a main HST, the driving apparatus being characterized in that the driving apparatus comprises:

a transmission unit for receiving a rotational output from the main HST, a steerable wheel drive shaft and a nonsteerable wheel drive shaft for receiving a rotational output from the transmission unit and transmitting the rotational output respectively to an axle for driving the steerable wheels and an axle for driving the nonsteerable wheels, and a differential unit having a differential power transmission mechanism for i) rotating the steerable wheel drive shaft at a speed increased by a rate according to a steering angle of a steering wheel to be handled by a driver and ii) rotating the nonsteerable wheel drive shaft at a speed decreased by said rate, wherein said driving apparatus is characterized in that the steerable wheel drive shaft drive shaft and the nonsteerable wheel drive shaft are arranged approximately on a common axis and spaced apart from each other at opposed ends thereof, the transmission unit comprising:

a main drive shaft disposed between the opposed ends of the steerable wheel drive shaft and the nonsteerable wheel drive shaft on the same axis as the two shafts, a driving power transmission mechanism for transmitting for transmitting the rotational output of the main HST to the main drive shaft, and a steerable wheel planetary gear unit and a nonsteerable wheel planetary gear unit for transmitting rotations of the main drive shaft respectively to the steerable wheel drive shaft and the nonsteerable wheel drive shaft so as to rotate the wheel drive shafts in one direction, the steerable wheel planetary gear unit having a first sum gear mounted on the main drive shaft, a first outer wheel surrounding the first sum gear, a first inner gear provided on an inner periphery of the first outer wheel, first planetary gears arranged between the first sum gear and the first inner gear, and a first carrier supported on the steerable wheel drive shaft nonrotatably relative thereto and rotatable with revolutions of the planetary gears, the nonsteerable wheel planetary gear unit having a second sun gear mounted on the main drive shaft, a second outer wheel surrounding the second sun gear, a second inner gear provided on an inner periphery of the second outer wheel, second planetary gears arranged between the second sun gear and the second inner gear, and a second carrier supported on the nonsteerable wheel drive shaft nonrotatably relative thereto and rotatably with revolutions of the second planetary gear.

3. A drive apparatus according to claim 2 which is characterized in that the differential unit comprises:

a differential HST for receiving the power from the drive source and outputting a rotational drive force, and a differential power transmission mechanism for receiving the rotational output from the differential HST and adjusting rotational speeds of the first outer wheel and the second outer wheel respectively in opposite directions to each other, the differential HST being adapted not to output the rotational drive force when the vehicle is advanced straight and to output the rotational drive force with a number of revolutions in accordance with the steering angle of the steering wheel when the vehicle is turned, the differential power transmission mechanism being adapted to adjust the rotational speed of the first outer wheel in the same direction as the rotational direction of the first sun gear rotated by the main HST and to adjust the rotational speed of the second outer wheel in a direction opposite to the rotational direction of the second sun gear rotated by the main HST.

4. A driving apparatus according to claim 3 which is characterized in that the differential HST has a hydraulic pump and a hydraulic motor, at least one of the hydraulic pump or the hydraulic motor being variable in displacement by operating a displacement altering member, the differential unit comprising a link mechanism coupling a steering wheel to be handled by a driver to the displacement altering member, the link mechanism being adapted to reduce approximately to zero a discharge rate of one of the hydraulic pump or the hydraulic motor which has the displacement altering member when the steering wheel is directed to advance the vehicle straight and to increase the discharge rate as the steering angle of the steering wheel increases when the steering wheel is directed to turn the vehicle.

5. A driving apparatus according to any one of claims 2 to 4 wherein the driving power transmission mechanism and the differential power transmission mechanism are each a power transmission gear mechanism.

6. A driving apparatus for a vehicle for transmitting power from a drive source installed in a body of the vehicle to steerable wheels and nonsteerable wheels via a main HST, the driving apparatus being characterized in that the driving apparatus comprises:

a transmission unit for receiving a rotational output from the main HST, a steerable wheel drive shaft and a nonsteerable wheel drive shaft for receiving a rotational output from the transmission unit and transmitting the rotational output respectively to an axle for driving the steerable wheels and an axle for driving the nonsteerable wheels, and a differential unit having a differential power transmission mechanism for i) rotating the steerable wheel drive shaft at a speed increased by a rate according to a steering angle of a steering wheel to be handled by a driver and ii) rotating the nonsteerable wheel drive shaft at a speed decreased by said rate, wherein said driving apparatus is characterized in that the steerable wheel drive shaft and the nonsteerable wheel drive shaft are arranged approximately on common axis and spaced apart from each other at opposed ends thereof, the transmission unit comprising a first differential gear mechanism having a pair of first sun gears fixedly mounted on each of the steerable wheel drive shaft and the nonsteerable wheel drive shaft at opposed ends thereof, the first differential gear mechanism comprising a first casing covering the pair of first sun gears and rotatably supported on the drive shafts, a first ring gear provided externally on the first casing for receiving the rotational output from the main HST, and a plurality of first planetary gears meshing with the pair of first sun gears and rotatably supported by a shaft fixedly provided inside the first casing and extending diametrically of the casing, the differential unit comprising a differential HST for receiving a power from the drive source and outputting a rotational drive force, a second differential gear mechanism for receiving the rotational output from the differential HST, and an adjusting transmission mechanism for transmitting an output from the second differential gear mechanism to the steerable wheel drive shaft and the nonsteerable wheel drive shaft, the second differential gear mechanism comprising pair of rotary shafts supported by a housing of the driving apparatus, arranged approximately on common axis and spaced apart from each other at opposed ends thereof, a pair of second sun gears fixedly mounted on the respective rotary shafts at their opposed end, a second casing covering the pair of second sun gears and rotatably supported on the pair of rotary shafts, a second ring gear provided externally on the second casing for receiving the rotational output from the differential HST, and a plurality of second planetary gears meshing with the pair of second sun gears and rotatably supported by a shaft fixedly provided inside the second casing and extending diametrically of the second casing, the adjusting transmission mechanism comprising two gear trains provided for the steerable wheel drive shaft and the nonsteerable wheel drive shaft respectively and each comprising a drive gear fixed to the rotary shaft, and a driven gear fixed to the corresponding drive shaft, at least one of two gear trains having at least one intermediate gear so as to render the two driven gears rotatable in directions different from each other, the drive gear and the driven gear of each of the gear trains being equal in diameter.

7. A driving apparatus for a vehicle for transmitting power via a main HST from a drive source installed in a body of the vehicle to a first pair of driving wheels and a second pair of driving wheels, the pairs of wheels being positioned at the front and rear of the vehicle body and at least one pair of the pairs of driving wheels being steerable, the driving apparatus being characterized in that the driving apparatus comprising:

a transmission unit for receiving a rotational output from the main HST, a first drive shaft and a second drive shaft for receiving a rotational output from the transmission unit and transmitting the rotational output respectively to an axle for driving the first pair of wheels and an axle for driving the second pair of wheels, and a differential unit for increasing a rotational speed of the steerable wheel drive shaft and decreasing a rotational speed of the nonsteerable wheel drive shaft proportionally according to a steering angle of a steering wheel to be handled by a driver, the transmission unit comprising a main drive shaft disposed between the steerable wheel drive shaft and the nonsteerable wheel drive shaft, a driving power transmission mechanism for transmitting the rotational output of the main HST to the main drive shaft, and a steerable wheel planetary gear unit and a nonsteerable wheel planetary gear unit for transmitting rotation of the main drive shaft respectively to the steerable wheel drive shaft and the nonsteerable wheel drive shaft so as to rotate the wheel drive shafts in a same direction, and the differential unit comprising a differential HST for receiving the power from the drive source and outputting an adjusted rotational drive force proportionally according to the steering angle of the steering wheel, and a differential power transmission mechanism for receiving the rotational output from the differential HST and giving mutually opposite additional rotations respectively to the steerable wheel planetary gear unit and the nonsteerable wheel planetary gear unit to cause the increased rotational speed of the steerable wheel drive shaft and the decreased rotational speed of the nonsteerable wheel drive shaft.

* * * * *